(12) United States Patent
Hopwood

(10) Patent No.: US 7,729,926 B1
(45) Date of Patent: Jun. 1, 2010

(54) METHODS AND APPARATUS FOR BACKING UP AND RESTORING DATA

(75) Inventor: Michael C. Hopwood, Jericho, VT (US)

(73) Assignee: Adobe Systems Inc., San JOse, CA (US)

( * ) Notice: Subject to any disclaimer, the term of this patent is extended or adjusted under 35 U.S.C. 154(b) by 993 days.

(21) Appl. No.: 11/353,546

(22) Filed: Feb. 14, 2006

(51) Int. Cl.
- *G06Q 10/00* (2006.01)
- *G06Q 30/00* (2006.01)
- *G06F 17/00* (2006.01)
- *G06G 7/00* (2006.01)

(52) U.S. Cl. .................. 705/1.1; 705/400
(58) Field of Classification Search ............ None
See application file for complete search history.

(56) References Cited

U.S. PATENT DOCUMENTS

| | | | |
|---|---|---|---|
| 5,901,228 A * | 5/1999 | Crawford | 705/34 |
| 2002/0052939 A1 * | 5/2002 | Lee | 709/223 |
| 2002/0091710 A1 * | 7/2002 | Dunham et al. | 707/200 |
| 2005/0102329 A1 * | 5/2005 | Jiang et al. | 707/204 |
| 2006/0036658 A1 * | 2/2006 | Henrickson | 707/204 |

OTHER PUBLICATIONS

Cooper, Brian F et al, Peer-to-Peer data preservation through storage auctions, IEEE Transactions on Parallel and Distributed Systems, vol. 16, No. 3, pp. 246-257, Mar. 2005.*

* cited by examiner

*Primary Examiner*—John W Hayes
*Assistant Examiner*—George Chen
(74) *Attorney, Agent, or Firm*—Chapin IP Law, LLC

(57) ABSTRACT

A system for backing up and restoring data operates by persistently storing or backing up data from a first medium to a second medium for subsequent access by a user. In one configuration, the backup process is performed at no monetary fee or charge to the user for backup, but only charges for restoration of data. The system receives a request to restore the data and obtains or calculates a restore cost to restore the data. The system identifies a set of restoration parameters associated with the data to be restored and computes the restore cost of the data based on the set of restoration parameters. The system receives an indication that payment of a restore cost has been made to restore the data and in response, performs a restoration operation on the data to restore the data for access by a user.

31 Claims, 11 Drawing Sheets

METHODS AND APPARATUS FOR BACKING UP AND RESTORING DATA

FIELD OF THE INVENTION

This invention related to systems for backing up and restoring data.

BACKGROUND

Conventional computer systems typically store data in a number of ways. Many computer systems store data locally to a storage device (e.g., hard drive), which is physically connected to the computer system. Another method of data storage is to store data to removable media such as floppy disks, compact discs (CDs), flash memory cards and the like. Yet another method of data storage includes storing data from a local computer system to a remote storage device via a network connection allowing the transfer of data from the local computer system to the remote storage system. These remote storage devices are typically remote computer systems having hard disk drives, tape drives and the like. In some instances, computer users or entire organizations can subscribe to remote data backup services that allow the user or an organization to pay a periodic (e.g. monthly) fee to have data from local computer(s) (e.g. the user's computer or a group of computers operating within the organization) backed up over a network to remote storage. Such conventional systems calculate and charge the monthly fee based on the amount of data being backed up by the remote system. In the event of data loss by the user or organization, the user or a computer administrator within the organization is able to operate software within the local computer system(s) to retrieve and restore the data from the remote backup system for access again by the local computer(s). In this manner, conventional backup and restore systems allow data that is lost to be recovered and restored.

Data storage systems such as the conventional backup systems noted above store data having various data sizes and data types (e.g., document files, spreadsheet files, image files, databases, and raw partitions to name a few). As a specific example, a user may store a collection of digital photography files. The digital photography files may have different file sizes, as well as different file types, such as bitmap images and/or various image compression types (e.g, JPEG).

Additionally, in another example of a conventional system for backing up data, a user may store the digital photography or other data or files to various removable media, such as floppy disks, CD's, flash memory cards or the like. As such, the user would generally be able to transfer and store the files to any other conventional computer system by physically inserting the removable media into a corresponding computer system and copying the files to that other system.

SUMMARY

Conventional mechanisms and techniques that operate to backup and restore data by storing data on various media or on a subscription basis at a remote location suffer from a variety of deficiencies. For example, a user that only stores data to a local hard drive on a computer system has limited, if any, means to recover data if the computer system is damaged or destroyed. Computer systems are vulnerable to floods, fires, power surges and many other unforeseen events that may damage or destroy the computer system and the data stored on the computer. Thus, storing data locally on a storage device is not the most reliable method for safeguarding and securing important data.

Additionally, storing and/or backing up data on removable media (e.g., CD's) can be a cumbersome process. Transferring data to removable media is generally time-consuming and resource intensive. Not only do removable media take up physical space, frequent backups to removable media may prove to be an expensive means for storing data, especially when more costly media are used (e.g., flash memory).

Similarly, storing data on a remote computer system under a paid subscription service can be an expensive means for storing and safeguarding data. In such conventional subscription-based backup and restore systems, a user has to pay upfront and/or pay intermittent fees to have their data stored on a remote system. For many, this is not a feasible method for long-term data storage. As an example, a user may not be able to afford monthly payments to store data on a remote computer system where the data will only need to be recovered in very limited circumstances, if at all. Likewise, a user may have to pay a premium to store a considerable amount of data on a remote server when only a fraction of the data will ever need to be restored. Pay-to-store backup systems create an issue in the human psychology in that most people are not as willing to pay for backing up data up-front in the event that something might go wrong and require the recovery of data. In other words, most people hope for the best instead of plan for the worst. The system described herein overcomes the up-front cost of the alternative pay-to-store systems.

Embodiments disclosed herein provide a backup and restoration system that significantly overcomes these and other limitations related to the remote backup/storage and restoration of data. Generally, the system disclosed herein provides the ability for a user (e.g. a user or organization) to arrange for backup of data from a computer system to a remote backup system at no monetary cost to the user for the backup portion of the service. However, when the user desires to restore data that has been backed up, the system requires payment for the restoration service. As will be disclosed more fully herein, the system provides mechanism and techniques to calculate a restoration cost, fee or payment that the user must make to restore and be granted access to the data that was formerly backed up at no charge. The computation of the restore cost that the user must pay if that user is to restore and gain access to the data can take into account individual or different combinations of restoration parameters. Examples of such restoration parameters include how much data is to be restored, how long the data has been backed up, how frequently the user requests restoration of the data to be backed up (or how frequently the user pays to restore any data using the system), how large the data is, what type of data is to be restored, quality of restoration (e.g. how quickly the data is available for restoration, speed of data restoration, encryption or security provided, etc) used during the restore process, how redundant the data was while it was being maintained in the backup storage system, an identity of the user, whether the computer to which the data is restored is the same computer from which the data was backed up, and so forth. By using combinations of these factors, the system can compute a restore cost that the user must pay to enable the user to again gain access to the data that was formerly backed up. In one example configuration, the type(s) of file(s) or data being restored and length of time they have been stored as backup data are used to calculate a restore cost. As a hypothetical example, if the restore cost of each megabyte of photo files is $1, plus $1 for each month that each megabyte had been stored, then 1 MB of digital photography files that had been stored as backup data for 1 year would cost the user $13 to restore. If 10 MB of digital photos had been stored 1 year, the cost to restore would be $130.

More specifically, configurations described herein provide mechanisms and techniques for restoring data by way of persistently storing data from a first medium to a second medium for subsequent access. The first medium may be, for example, a remote personal computer and the second medium may be a tape or disk drive that is associated with the backup and restoration system that is remotely located from the first medium (or the system may be local to the computer system). Generally, the backup process as explained herein actively and/or passively stores data from the first medium to the second medium. For example, the backup process may actively store data to the second medium while operating as a backup client software process operating on a user's computer. Alternatively, the backup process may passively store data when a user initiates the backup process (e.g. backup on demand). For example purposes, a user may be a human operating a computer system, or the may be an automated computer process that operates a computer system in conjunction with, or in lieu of, a human operator.

The restore process includes a payment process as described herein that receives a request to restore data and subsequently obtains a restore cost based on certain restoration parameters. For example, the restoration parameters may include, but are not limited to, the type of data, size of data, data life, destination of the data, frequency of restoration, quality of restoration and other various metrics and methods for pricing data restoration. As disclosed in various configurations, the payment process utilizes a plurality of restoration parameters available to the computer to compute or otherwise obtain a restore cost. Various calculations using restoration parameters will be detailed below. Furthermore, the payment process receives an indication from a user that payment of the restore cost has been made. Depending on the sufficiency of the payment vis-à-vis the restore cost, the payment process will determine whether or not to restore the requested data. In one configuration, the system can restore the data before payment is made, but disable access to the data, until confirmation is received that the user has provided the required computer restore cost. In another configuration, the user is able to identify the data to be restored, but no restoration process is started until the restore cost is computed (e.g. based on the data selected by the user to restore) and until the user has provided payment.

The restore process, as explained herein, performs a restoration operation on the data that is requested to be restored which results in a user recovering data that was originally stored on the backup and restoration system. As noted above, the data may be restored in either an accessible or inaccessible state to the user. In one configuration discussed herein, if data is restored in an inaccessible state, full remuneration of the restore cost is required to change the restored data into an accessible state to the user. Other variations of the system will be detailed below.

Other embodiments of the data backup and restoration system include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the data backup and restoration system.

Other embodiments of the data backup and restoration system that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangement are typically provided as software, code and/or other data (e.g., data structures) arranged or encoded on a computer-readable medium such as an optical medium (e.g., CD-ROM), floppy or hard disk or other media such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Another example of a computer-readable medium is a propagated signal or carrier signal that can transfer instructions that, when received by the computer, can be decoded and executed to perform the operations explained herein.

It is to be understood that the data backup and restoration system can be embodied strictly as a software program, as software and hardware, or as hardware alone such as within a processor, or within an operating system or within a software application. Example embodiments of the data backup and restoration system may be implemented within products and/ or software applications manufactured by Adobe Systems, Inc. of San Jose, Calif., USA.

BRIEF DESCRIPTION OF THE DRAWINGS

The foregoing and other objects, features and advantages of the data backup and restoration system will be apparent from the following more particular description of embodiments of the data backup and restoration system, as illustrated in the accompanying drawings and figures in which like reference characters refer to the same parts throughout the different views. The drawings are not necessarily to scale, with emphasis instead being placed upon illustrating the embodiments, principles and concepts of the backup and restoration system.

DETAILED DESCRIPTION

Figure 1:
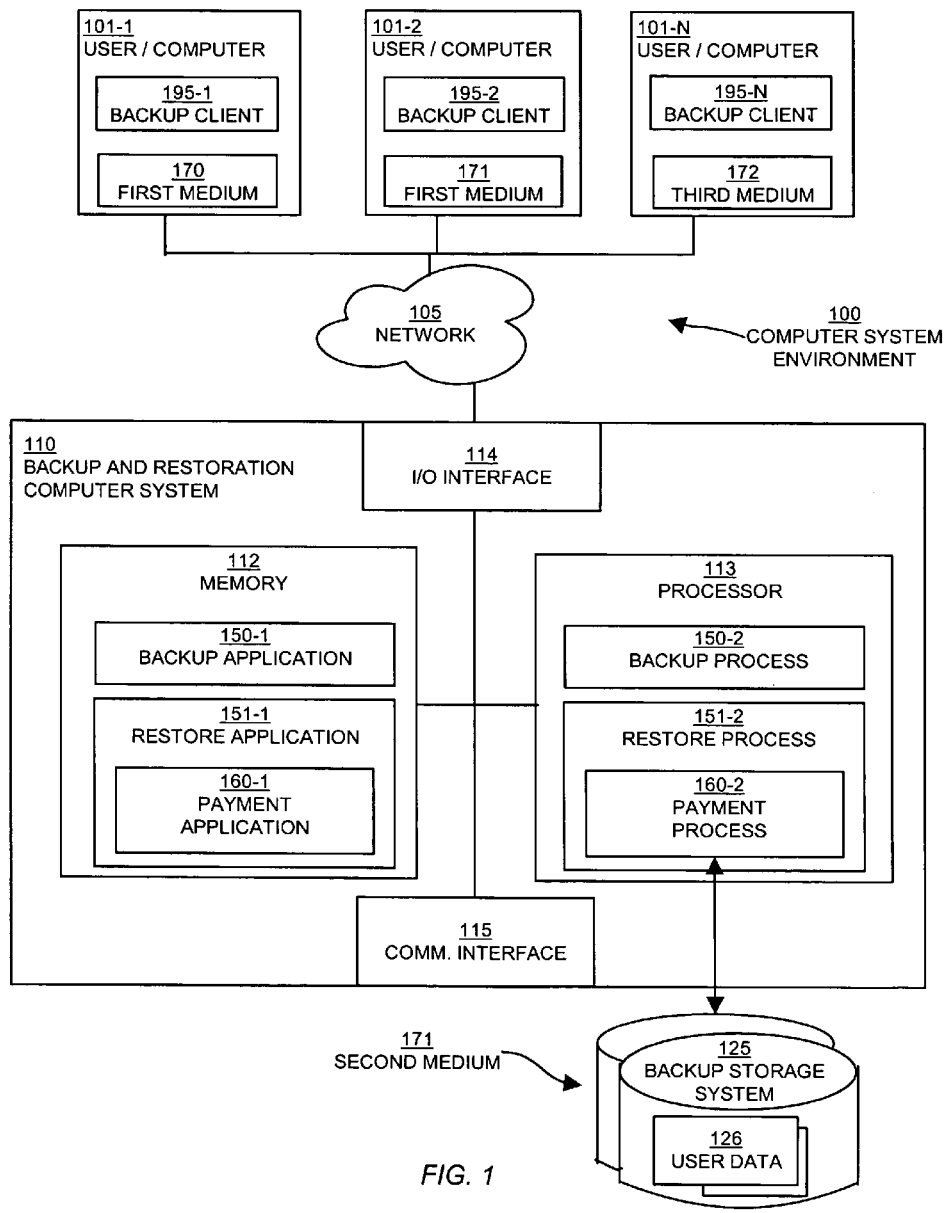
FIG. 1 is a block diagram of a computer system configured with a backup application and a restore application including a payment application in accordance with one embodiment of the backup and restoration system.

FIG. 1 is a block diagram of a computer system environment 100 illustrating an example architecture of a computer system 110 that executes, runs, interprets, operates or otherwise performs a backup application 150-1 and process 150-2, and a restore application 151-1 and process 151-2 that includes a payment application 160-1 and process 160-1 suitable for use in explaining example configurations of the data backup and restoration system. The computer system 110 and users (or user computers) 101-1, 101-2 and 101-3 represent any type of computerized device(s) such as a personal computer, workstation, portable computing device (e.g. Personal Digital Assistant, Cell phone, etc.), console, laptop, network terminal or the like. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (e.g., users 101-1, 101-2 and 101-3) on a network 105. This allows access through the network 105 to the backup application 150-1 and restore application 151-1 by the backup clients 195 operating in the remote user computer systems 101. Note that in an alternative configuration, the backup storage system 125 may be remote (i.e. coupled via network 105) for access by the computer system 110.

The memory system 112 is any type of computer readable medium and in this example is encoded with a backup application 150-1 and restore application 151-1 that includes a payment application 160-1 that supports backup, restoration and payment implementations of user data 126, as explained herein. The backup application 150-1, restore application 151-1 and payment application 160-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the backup application 150-1, restore application 151-1 and payment application 160-1. Execution of backup application 150-1, restore application 151-1 and payment application 160-1 in this manner produces processing functionality in a backup process 150-2, restore process 151-2 and payment process 160-2, respectively. In other words, the backup process 150-2, restore process 151-2 and payment process 160-2 represent one or more portions or runtime instances of the backup application 150-1, restore application 151-1 and payment application 160-1 (or the entire applications 150-1, 151-1 and 160-1), respectively, performing or executing within or upon the processor 113 in the computer system 110 at runtime. Note that in this example, the backup and restore applications are shown as separate software programs. It is to be understood that in one configuration, these may be combine into one software application to operates on the computer system 110.

Generally, in the illustrated configuration, a user 101 (note that user 101 refers to a person operating the user computer 101, and hence as used herein, the term user and user computer are generally interchangeable) is able to engage a backup client 195 to remotely engage and operate the backup application and process 150 to cause the backup storage system 125 to store (i.e. persistently store, for later retrieval) user data 126 in backup form in accordance with techniques described herein within a computer readable medium, at no charge to the user of the user computers 101. In other words, the user(s) and able to backup data from user computers 101 and no fee, payment or other monetary exchange is required for this backup processing. The user 101 may perform a registration process of his or her client 195 that identifies the user and user computer 101 (i.e., giving an account to that user for backup processing, and possible restore processing, if needed), but the user is not required to pay a fee to register or backup data 126. However, if a loss of data occurs at a user computer 101, the user computer 101 can invoke access to the restore application and process 151 (over the network 105, for example via a browser operating on the user computer 101) to allow the user to pay a fee (as calculated and tracked by the payment application and process 160) to have the data 126 restored in an accessible manner to the user computer 101 (or to a different computer, such as a new computer the user has purchased to replace an old or faulty computer 101). The restore application and process 151 (including the payment application and process 160) can calculate the fee based on a variety of factors referred to herein as restore parameters. The restoration process restores the data (e.g. files and directories or database data) in its original directory structure and hierarchy.

As illustrated in FIG. 1, computer system 110 interacts with a plurality of users 101-1, 101-2 and 101-3 via network 105. In various embodiments of the backup and restoration system, a user 101 can be a human that manually operates a remote computer system (i.e., 101 representing the user and his or her computer) in order to interact with backup process 150-2, restore process 151-2 and payment process 160-2. Alternatively, an automated computer process (e.g., client-side software application represented as the user 101) operates a computer system in order to interact with backup process 150-2, restore process 151-2 and payment process 160-2. The automated computer process may operate in conjunction with, or in lieu of, a human operator.

It is noted that example configurations disclosed herein include the backup application 150-1, restore application 151-1 and/or payment process 160-1 themselves (e.g., in the form of unexecuted or non-performing logic instructions and/or data). The backup application 150-1, restore application 151-1 and payment application 160-1 may be stored (e.g. as code or other data) or encoded on a computer readable medium (such as a floppy disk), hard disk, electronic, magnetic, optical or other computer readable medium. The backup application 150-1, restore application 151-1 and payment application 160-1 may also be stored in memory system 112 such as firmware, read only memory (ROM), or, as in this example, as executable code in, for example, random access memory (RAM). In addition to these embodiments, it should also be noted that other embodiments herein include the execution of the backup application 150-1, restore application 151-1 and payment application 160-1 in the processor 113 as the backup process 150-2, restore process 151-2 and payment process 160-2, respectively. Those skilled in the art will understand that the computer system 110 may include other processes and/or software and hardware components, such as an operating system not shown in this example.

Figure 2:
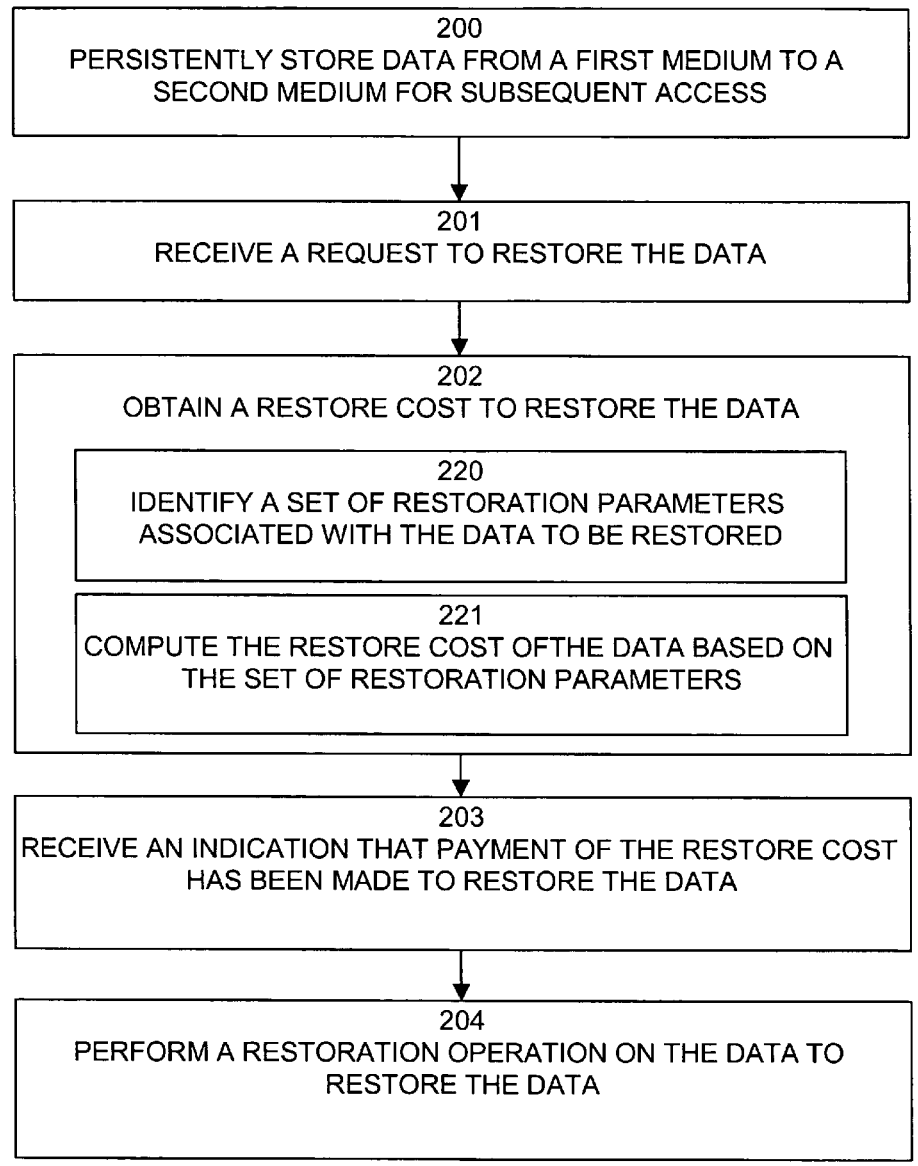
FIG. 2 is a flow chart of processing steps that shows high-level processing operations performed in accordance with one example configuration of the backup and restoration system.

FIG. 2 is a flow chart of processing steps performed according to configurations disclosed herein to store data from a user 101 to the computer system 110 and then to restore data in an accessible form to the user contingent upon payment of a restore cost obtained or computed as explained herein.

In step 200, backup process 150-2 persistently stores data 126-1 (shown as backup data 126-1 in FIG. 1) from a first medium 170 to a second medium 171 for subsequent access. By persistently store, what is meant in one example configuration is that that backup process 150-2 maintains the data 126-1 for later retrieval at any future time, until a user determines that this data is no longer needed. Such storage may take place, for example, on an offline medium such as tape backup. Assume for this example description that the first medium 170 is a hard drive on a personal computer and the second medium 171 is backup storage system 125 associated with the computer system 110. In one configuration the backup process 160-2 persistently stores data 126-1 at fixed and/or irregular intervals that are preset by a user 101 and/or backup process 150-2. In other configurations, a user can actively engage the backup process 160-2 as needed (e.g. on the fly) to store data from the first medium 170 to the second medium 171. For example, the backup process 160-2 may actively store data 126-1 to the second medium 171 under direction of a client software process 175 operating on a user's computer system 101 in accordance with a schedule that the user pre-configures upon installation of the client backup and restore program or process 175. Alternatively, the backup process 160-2 may store data when a user initiates the backup process manually via activation of the client 175 (i.e. when the user decides it is time to backup the data). In some cases, the backup process 160-2 may both actively and passively store data to the second medium 171 via network 105 at varying intervals.

In step 201, the restore process 151-2 receives a request 127 to restore the data 126 (i.e., the data 126 that is backed up in the backup storage system 125). As will be explained in more detail, the request 127 to restore data may be initiated by a user 101 to restore data originally backed up from the first medium 170, or the request may be initiated by the user 101 from a third medium 172 that was not originally associated with backup process 150-2. The request 127 to restore data indicates the particular data 126 that is to be restored to a particular user computer 101. The data 126 can be stored in backup form having various data sizes and data types (e.g., document files, spreadsheet files, image files, databases, and raw partitions to name a few). The system may identify and maintain other properties of the data 126 as well, such as the identity of a specific computer system from which the data was backed up, an identity of the user who created the backup, a time of the backup for specific portions of the data 126, and so forth.

As a specific example, a user may store a collection of digital photography files (i.e., a type of data) from his personal computer (i.e., a specific computer) at a certain time (i.e. backup time) to the backup storage 125 system via network 105 and backup process 150-2. The digital photography files may have different file sizes, as well as different file types, such as bitmap images and/or various image compression types (e.g., JPEG). Thus, as applied in this example, the request 127 to restore data would indicate several things, such as which, if not all, photography files to restore from backup storage system 125, the identity of the user computer (e.g. a processor serial number, IP address, ether net address, operating system serial number, or other unique computer identity), and the user identity requesting the restore. Moreover, the user 101 could restore the particular photography files from the backup storage 125 to either the first medium 170-1 (e.g., personal computer at home) or to another user selected third medium 170-N (e.g., laptop computer at work). The request to restore 127 can include such information.

In step 202, the payment process 160-2 obtains a restore cost to restore the data 126. The restore cost is the amount a user must pay in order to have data restored to an accessible state. In various configurations disclosed herein, the restore cost is calculated based one or more restoration parameters.

In sub-step 220, as will be described in more detail, the payment process 160-2 identifies a set of restoration parameters associated with the data 126 to be restored. The restoration parameters may be configured and/or reconfigured at any time before, during and/or after the restoration of data. Additionally, the restoration parameters may be configured and/or reconfigured by a user and/or the payment process 160-2. As an example, the restoration parameters that the payment application and process 160 can use to compute the restore cost may include any of the above information provided in the request 127 to restore data (e.g. identity of user, host identity, location to be restored to, etc.), and may also include metrics or information concerning the data itself, such as its type, size (i.e. amount of data to be restored, or amount of total data backup for this user regardless of how much is being restored), how long the data has been stored, how securely it has been stored (e.g. redundantly in multiple backup sites, or only in one backup site), a quality of restoration (e.g. speed of the restore process), how many times this data or other data for this user has been restored, and so forth.

In sub-step 221, payment process 160-2 computes the restore cost 180 based on the identified set of restoration parameters that are associated with the data 126 to be restored. The configuration of the restoration parameters determines, at least in part, the amount of the restore cost. By using various combinations of such restoration parameters in a restore cost computation function, the system disclosed herein can price (i.e., can compute) the restore cost appropriately to cover the overhead cost of performing backups for the user without having to charge that user for the actual backup process. This enables the user to not have to pay for the backup processing, but instead, only pay for restore processing.

In step 203, payment process 160-2 receives an indication that payment of the restore cost 180 has been made to restore the data 126. The restoration of data, as performed by restore process 151-2, to an accessible state is contingent upon payment of the restore cost.

In step 204, restore process 151-2 performs a restoration operation on the data to restore the data requested by the user. For example, the restoration operation stores data from backup storage system 125 to any user selected medium, such as a personal computer. In an alternative embodiment, in addition to or in place of restoring data to a user's personal computer, the data may be restored by writing it to a CD or DVD or other storage medium at a processing facility, and is then shipped, carried or transported to the user for insertion into the user's computer to restore the data from this medium. In another alternative, if the data is, for example, photographs, the restore process 151-2 performs a restoration operation on the data to restore the data requested by the user by printing out new copies of the photos and sending them to the user (e.g. via postal mail or delivery service).

As explained further below, the data may be restored in either an accessible or inaccessible state to a user 101. The state of the restored data depends upon when the indication that payment of the restore cost has been made.

In an alternative configuration to the flow of processing in FIG. 2, the user requests a restore from their client and restore process 151-2 authenticates the user and provides the user with a listing of files they have backed up with a price or restore cost for restoring all (or individual files) with a single click of the input device. At this point, the user can choose to select only some of the files by a variety of methods of selection factors such as choosing the file(s) by path name or directory, file name, file type, date of backup, file size, restore cost (e.g. all files less than $1 each), and so forth. In this example configuration, the user can see previews of each file (e.g. a locked PDF (Portable Document Format file or document) of the first page of each file) along with all available metadata for the files to ensure they are the correct files. Once the files are selected by the user, a price of the total restore cost is shown to the user and the user can then choose to restore, cancel restore, or select a different set of files.

FIGS. 3 through 9 are flow charts of processing steps that show details of processing steps 202, 220 and 221 (from FIG. 2) that obtain and compute a restore cost to restore data based on a set of restoration parameters in accordance with example configurations. Processing steps 202, 220 and 221 explained above are repeated in the flow charts below in FIGS. 3 through 9 to assist the reader in understanding how sub-steps shown in these flow charts support the overall processing shown by steps 202, 220 and 221 as discussed above in various example configurations. It is to be understood that these configurations are shown by way of example only and are not intended to limit the scope of the backup and restoration system to such exact example descriptions.

Figure 3:
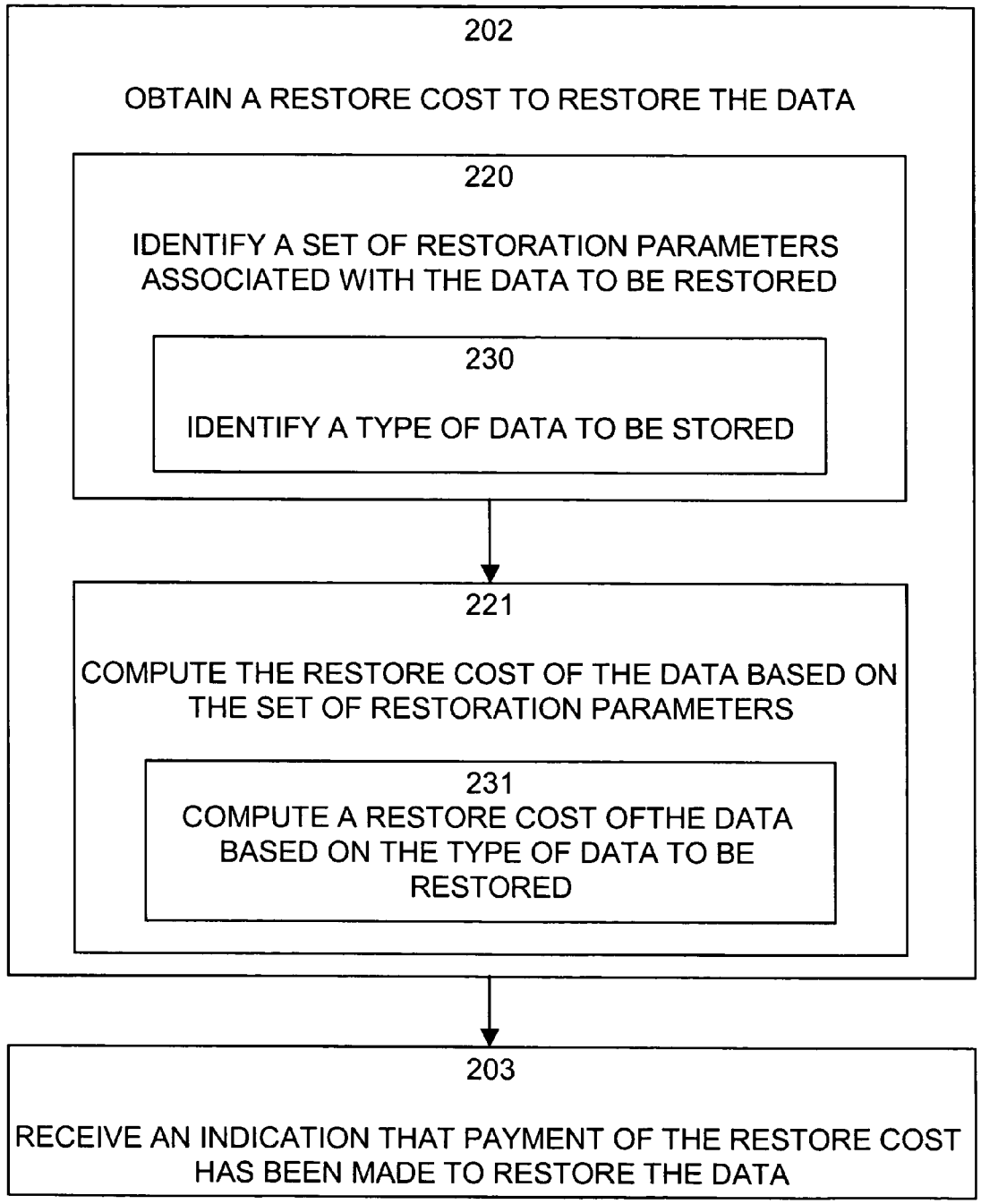
FIGS. 3 through 9 are flow charts of processing steps that show details of processing operations to obtain (e.g., calculate or compute) a restore cost in order to restore data in accordance with example configurations of the backup and restoration system.

In FIG. 3, in step 220, the payment process 160-2 identifies a set of restoration parameters associated with the data 126 to be restored. Furthermore, in step 221, the payment process 160-2 computes a restore cost based on a set of restoration parameters. Sub-steps 230 and 231 show details of this processing in one example configuration.

In sub-step 230, payment process 160-2 identifies a type of data to be restored. Thus, the particular type of data that is requested to be restored is a restoration parameter that determines, at least in part, the restore cost. The type of data to be restored can be any one of a document file, a spreadsheet file, an image file, a database, a raw partition or the like. For example, a user 101 may request to restore digital photography files. As a result, the restore cost would be determined, at least in part, by the restoration parameter as defined by the image files data type.

In sub-step 231, payment process 160-2 computes a restore cost of the data based on a type of data that was identified in sub-step 230. Furthermore, in an example configuration, payment process 160-2 computes a first restore cost on data having a first data type that is different than a second restore cost computed on data having a second data type. For example, payment process 160-2 computes a first restore cost for image files, while a second restore cost is computed for document files. In one configuration, the first restore cost for image files is different than the second restore cost for document files. It should be noted that the first restore cost may be more than the second restore cost, or vice versa.

Figure 4:
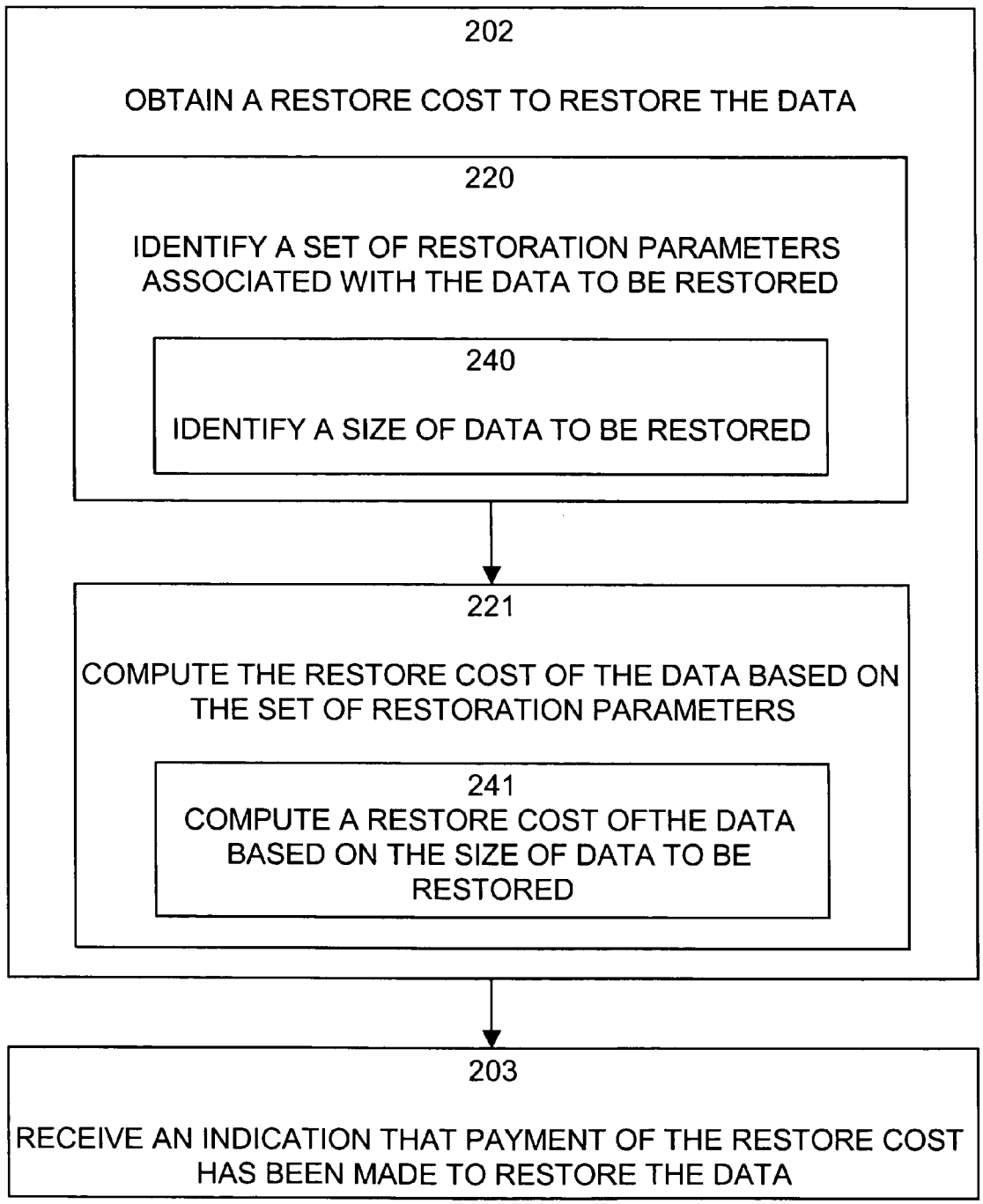

In FIG. 4, in step 220, payment process 160-2 identifies a set of restoration parameters associated with the data 126 to be restored. Furthermore, in step 221, payment process 160-2 computes a restore cost based on a set of restoration parameters. Sub-steps 240 and 241 show details of this processing in one example configuration.

In sub-step 240, payment process 160-2 identifies a size of data to be restored. Thus, the particular size of data to be restored is a restoration parameter that determines, at least in part, the restore cost. The size of data to be restored is the aggregate size of all data that a user 101 has requested to restore. The size is measured in the standard memory unit format as used in the computer system 110, typically bytes or any degree of magnitude thereof (e.g., bits, kilobytes, megabytes, etc.). For example, a user 101 may again request to restore a collection of digital photography files having an aggregate size of two megabytes. As a result, the restore cost would be determined, at least in part, by the restoration parameter as defined by two megabytes of data. Additionally, the size of data may be measured by an application specific or operator defined metric, notwithstanding the standard memory unit format of computer system 110.

In sub-step 241, payment process 160-2 computes a restore cost of the data based on a size of data that was identified in sub-step 240. Furthermore, in an example configuration, payment process 160-2 computes a first restore cost on data having a first data size that is different than a second restore cost computed on data having a second data size. As a specific example, payment process 160-2 computes a first restore cost for data having a size of two gigabytes, while a second restore cost is computed for data having a size of fifty kilobytes. In one configuration, the first restore cost computed according to two gigabytes of data is different than the second restore cost computed according to fifty kilobytes of data. It should be noted that the first restore cost may be more than the second restore cost, or vice versa.

Figure 5:
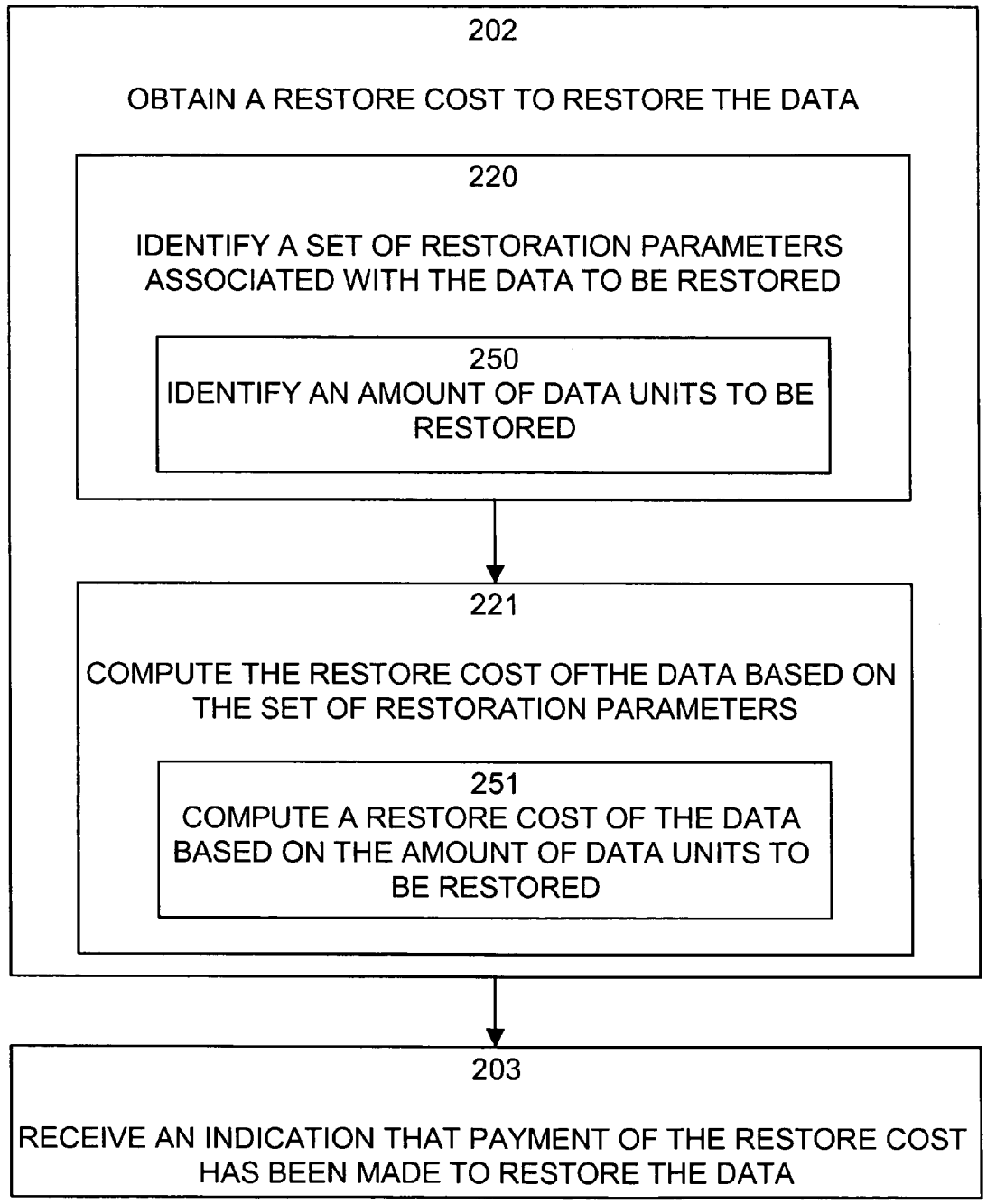

In FIG. 5, in step 220, payment process 160-2 identifies a set of restoration parameters associated with the data 126 to be restored. Furthermore, in step 221, the payment process 160-2 computes a restore cost based on a set of restoration parameters. Sub-steps 250 and 251 show details of this processing in one example configuration.

In sub-step 250, the payment process 160-2 identifies an amount of data units to be restored. Thus, the particular amount of data units that are requested to be restored is a restoration parameter 195 that determines, at least in part, the restore cost. A data unit is a collection of data grouped into a single and identifiable entity, such as a file, a database, a raw partition and the like. For example, a user 101 may request to restore a collection twenty document files. As a result, the restore cost would be determined, at least in part, by the restoration parameter as defined by twenty data units.

In sub-step 251, payment process 160-2 computes a restore cost of the data based on an amount of data units that were identified in sub-step 250. Furthermore, in one specific example, payment process 160-2 computes a first restore cost on a first amount of data units that is different than a second restore cost computed on a second amount of data units. For example, the payment process 160-2 computes a first restore cost for a restore request of ten spreadsheet files, while a second restore cost is computed for a restore request of sixty spreadsheet files. In an example configuration, the first restore cost is different than the second restore cost. It should be noted that computing a restore cost based on an amount of data units to be restored is independent of data size and data type. Thus, as another example, payment process 160-2 computes a first restore cost for a restore request of ten spreadsheet files having an aggregate size of eighty kilobytes, while a second restore cost is computed for a restore request of sixty databases having an aggregate size of three gigabytes. The computation of restore costs would be the same as in the previous example with a first restore cost based on ten data units and a second restore cost based on sixty data units. It should be noted that the first restore cost may be more than the second restore cost, or vice versa.

Figure 6:
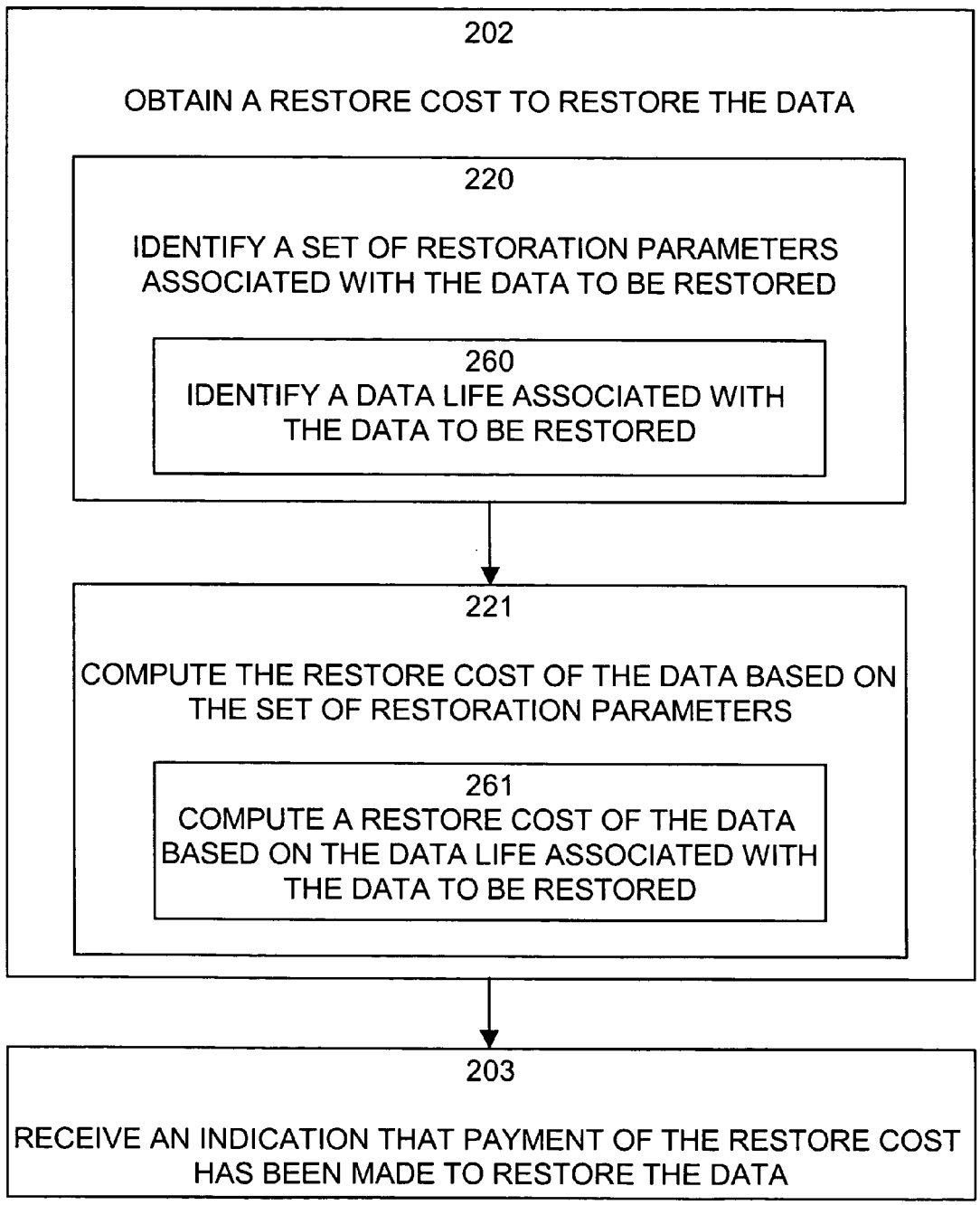

In FIG. 6, in step 220, payment process 160-2 identifies a set of restoration parameters associated with the data 126 to be restored. Furthermore, in step 221, payment process 160-2 computes a restore cost based on a set of restoration parameters. Sub-steps 260 and 261 show details of this processing in one example configuration.

In sub-step 260, payment process 160-2 identifies a data life associated with the data to be restored. Thus, the particular data life associated with the data to be restored is a restoration parameter that determines, at least in part, the restore cost. The data life indicates the amount of time since the data to be restored was first stored to the computer system 110 on the second medium 171 (e.g., backup storage system 125). The amount of time is calculated from approximately the time backup process 150-2 first stored the data 126 to computer system 110 on the second medium 171, and up to approximately the time payment process 160-2 receives a request to restore the data. For example, a user 101 may request to restore an image file having a data life of two months. As a result, the restore cost would be determined, at least in part, by the restoration parameter as defined by a two month data life.

In sub-step 261, payment process 160-2 computes a restore cost of the data based on a data life that was identified in sub-step 260. Furthermore, in an example configuration, payment process 160-2 computes a first restore cost on data having a first data life that is different than a second restore cost computed on data having a second data life. As a specific example, payment process 160-2 computes a first restore cost for an image file having a data life of five days, while a second restore cost is computed for an image file having a data life of nine months. As a result, the first restore cost computed according to a five day data life is different than the second restore cost computed according to a nine month data life. It should be noted that computing a restore cost based on a data life associated with the data to be restored is independent of data size and data type. Thus, as another example, payment process 160-2 computes a first restore cost for a restore request of a spreadsheet file having a size of eighty kilobytes and data life of five days, while a second restore cost is computed for a restore request of a database having a size of three gigabytes and data life of nine months. The computation of restore costs would be the same as in the previous example with a first restore cost based on five day data life and a second restore cost based on a nine month data life. It should be noted that the first restore cost may be more than the second restore cost, or vice versa. Additionally, in one configuration, a maximum data life may also be specified such that a restore cost is the same for certain data having data lives exceeding the specified maximum data life. In an alternative configuration, the computation of data life may be adjusted according to the number and frequency of updates and amendments made to a particular file.

Figure 7:
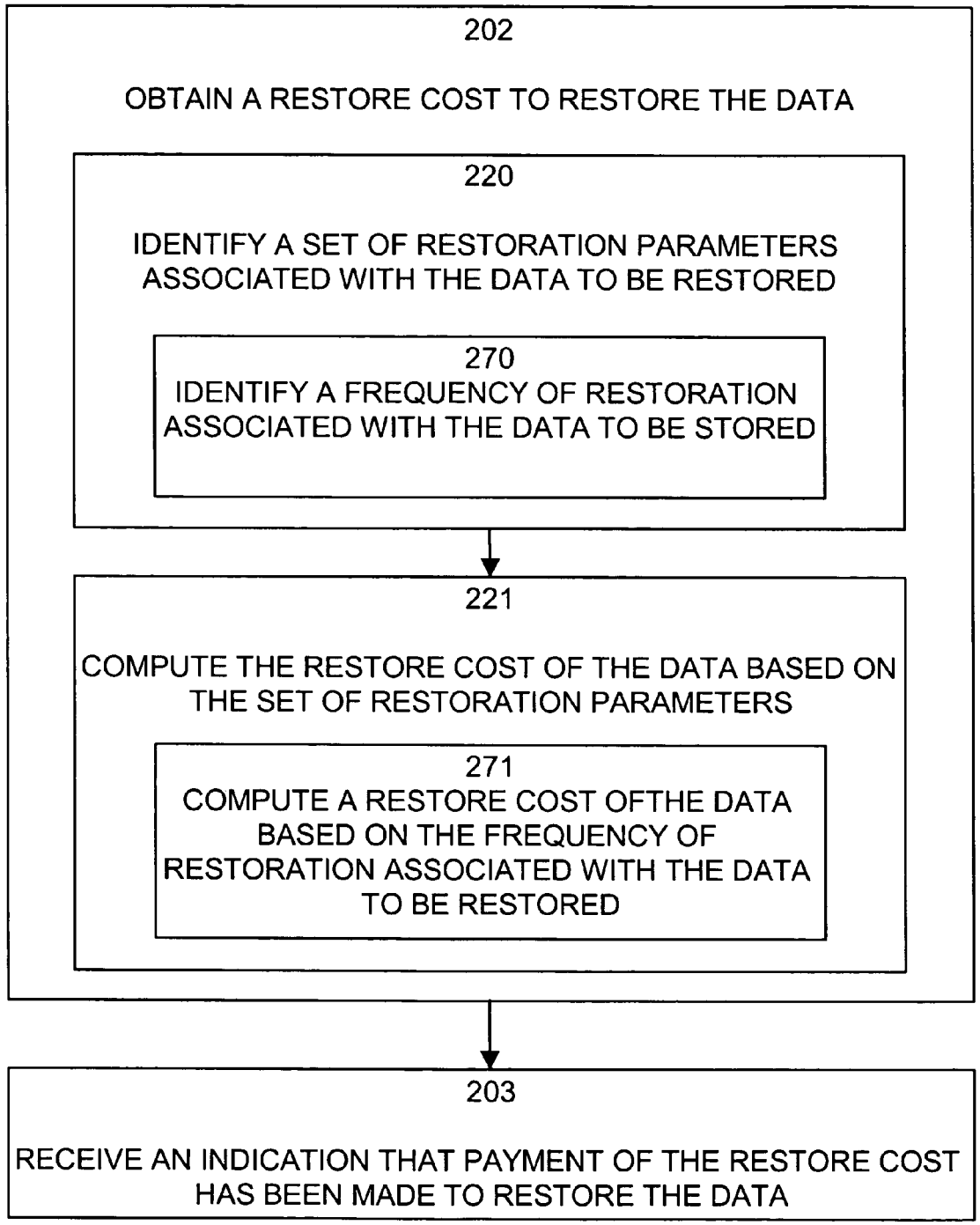

In FIG. 7, in step 220, payment process 160-2 identifies a set of restoration parameters associated with the data 126 to be restored. Furthermore, in step 221, payment process 160-2 computes a restore cost based on a set of restoration parameters. Sub-steps 270 and 271 show details of this processing in one example configuration.

In sub-step 270, payment process 160-2 identifies a frequency of restoration associated with the data to be restored. Thus, the particular frequency of restoration associated with the data to be restored is a restoration parameter that determines, at least in part, the restore cost. The frequency of restoration corresponds to a number of requests to restore data a user 101 initiates prior to the contemporaneous request to restore data. The prior requests to restore data initiated by a user may have been for the same and/or different data than the data to be restored in the contemporaneous request. Alternatively, in another embodiment of the backup and restoration system, the frequency of restoration may also correspond to a number of prior requests per a calculated time interval. Typically, the time interval is calculated by the amount of time between the first prior request to restore and the last prior request to restore. For example, a user 108 may request to restore a digital photography file. In another configuration, the time interval is calculated by the amount of time between the first prior request to restore data and the contemporaneous request to restore data. Moreover, the user has made four prior requests to restore the digital photo of his house over a time span of one year. As such, in one embodiment of the backup and restoration system, the frequency of restoration is one request to restore data (the digital photo) for every three months or, congruently, four requests to restore data for every year. Thus, the restore cost would be determined, at least in part, by the restoration parameter as defined by the frequency of restoration associated with one request to restore data for every three months (or four requests for every year).

In sub-step 271, payment process 160-2 computes a restore cost of the data based on a frequency of restoration that was identified in sub-step 270. Furthermore, in one configuration, payment process 160-2 computes a first restore cost on data having a first frequency of restoration that is different than a second restore cost computed on data having a second frequency of restoration. As an example, payment process 160-2 computes a first restore cost for an image file that has received five prior requests to restore data over a span of two years, while a second restore cost is computed for an image file that has received one prior request to restore over a span of two months. As a result, the first restore cost associated with the frequency of restoration for the image file is different than the second restore cost associated with the frequency of restoration for the document file. It should be noted that the first restore cost may be more than the second restore cost, or vice versa.

Figure 8:
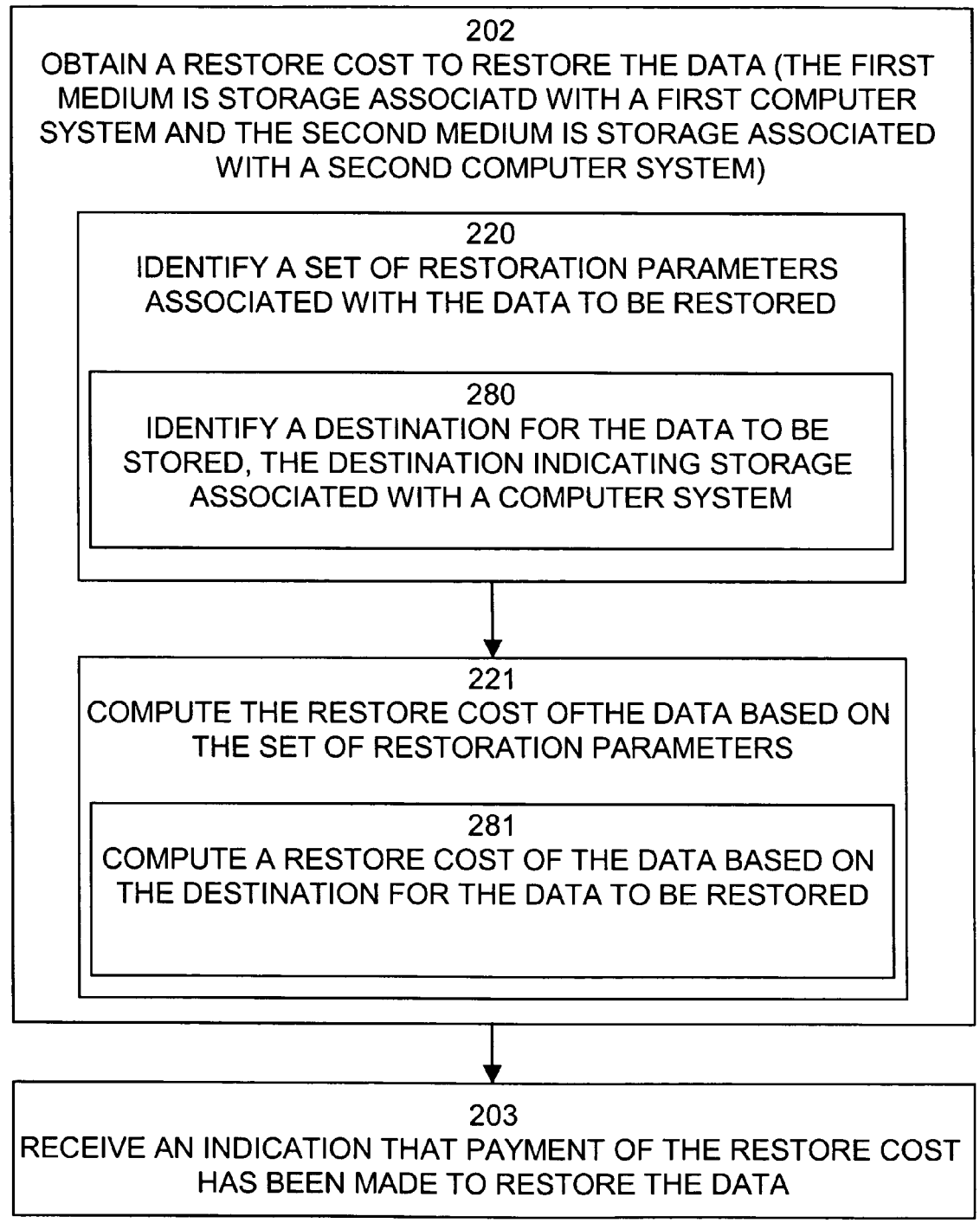

In FIG. 8, in step 220, payment process 160-2 identifies a set of restoration parameters associated with the data 126 to be restored. Furthermore, in step 221, payment process 160-2 computes a restore cost based on a set of restoration parameters. Sub-steps 280 and 281 show details of this processing in one example configuration.

In sub-step 280, payment process 160-2 identifies a destination for the data to be restored. Thus, the particular destination for the data that is requested to be restored is a restoration parameter that determines, at least in part, the restore cost. The destination is storage associated with a computer system where the restore process 151-2 can store the data that has been requested to be restored. In one configuration, the storage associated with a computer system may be the first medium 170 from which the data was originally stored. Alternatively, in another embodiment of the backup and restoration system, the storage associated with a computer system may be a third medium 172 specified by a user 101 which is different than the first medium 171. As a result, the restore cost would be determined, at least in part, by the restoration parameter as defined by the destination designated to receive the restored data.

In sub-step 281, payment process 160-2 computes a restore cost of the data based on a destination that was identified in sub-step 280. Furthermore, in an example configuration, payment process 160-2 computes a first restore cost on data having a first destination that is different than a second restore cost computed on data having a second destination. For example, payment process 160-2 computes a first restore cost for an image file with a first destination designated as storage associated with a first computer (e.g., a personal computer located at a user's home), while a second restore cost is computed for the same image file with a second destination designated as storage associated with a second computer (e.g., a laptop computer located at the user's workplace). As a result, the first restore cost associated with the first destination is different than the second restore cost associated with the second destination. It should be noted that the first restore cost may be more than the second restore cost, or vice versa.

Figure 9:
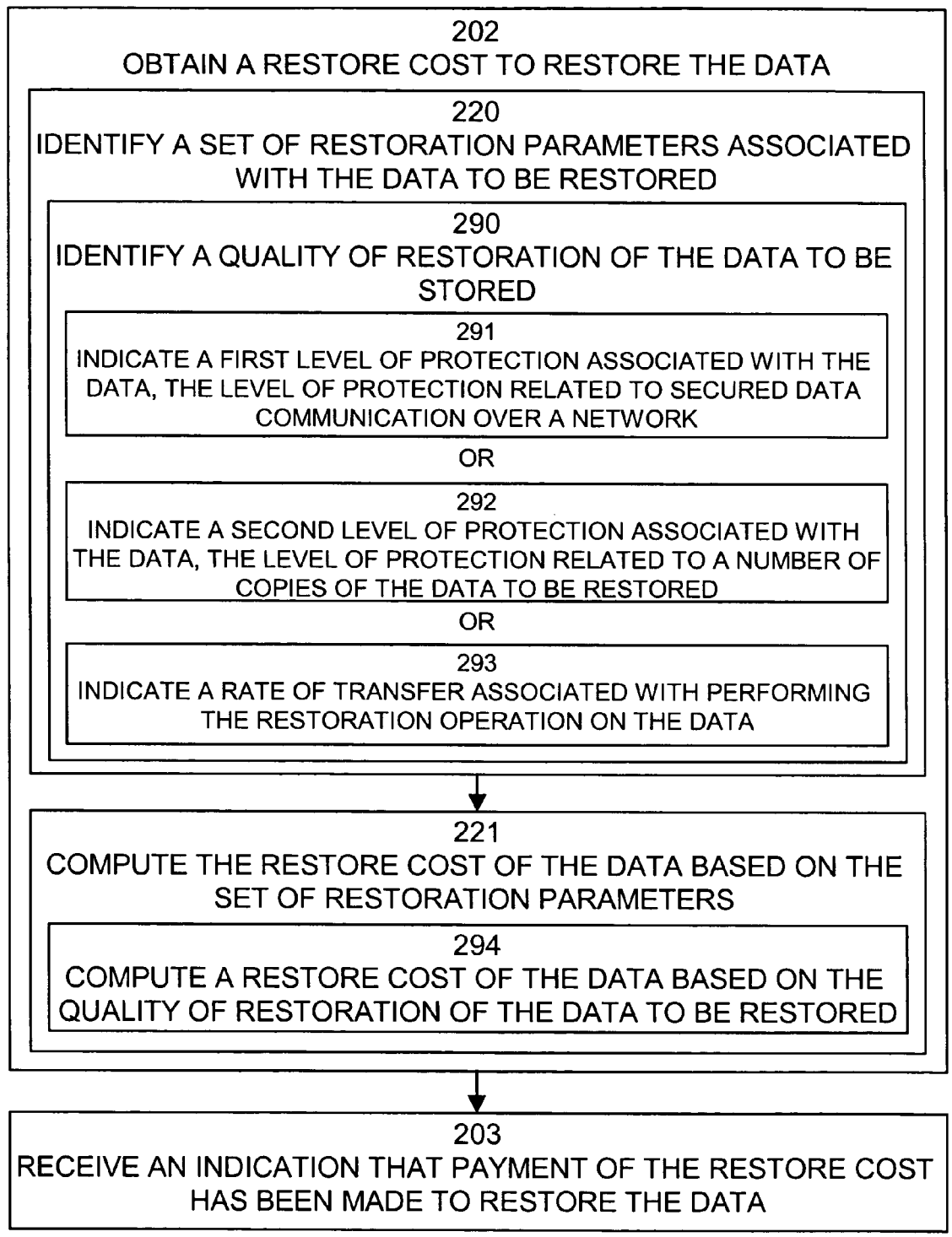

In FIG. 9, in step 220, payment process 160-2 identifies a set of restoration parameters associated with the data 126 to be restored. Furthermore, in step 221, payment process 160-2 computes a restore cost based on a set of restoration parameters. Sub-steps 290 through 294 show details of this processing in one example configuration.

In sub-step 290, payment process 160-2 identifies a quality of restoration associated with the data to be restored. Thus, the particular quality of restoration associated with the data that is requested to be restored is a restoration parameter that determines, at least in part, the restore cost. As will be explained in more detail, the quality of restoration associated with the data to be restored relates to certain data storage and data communication criteria.

In sub-step 291, the quality of restoration indicates a first level of protection associated with the data to be restored. The first level of protection relates to secured data communication over a network. In one embodiment of the backup and restoration system, the level of protection corresponds to a level of encryption that is implemented to store data to the second medium 171 via backup process 150-2 and to restore data via restore process 151-2 over network 105. Thus, the restore cost would be determined, at least in part, by the restoration parameter as defined by the level of encryption implemented during the backup process 150-2 and/or restore process 151-2.

In sub-step 292, the quality of restoration indicates a second level of protection associated with the data to be restored. The second level of protection relates to the number of copies of the data to be restored. Copies, also referred to as mirrors, are stored on the backup storage system 125. In another embodiment of the backup and restoration system, copies of the data to be restored are stored on a plurality of backup storage systems. Backup process 150-2 creates the copies of data that are stored on the one or more backup storage devices. In various configurations, the number of copies of data and the number of backup storage units that are used are both factors in determining the quality of restoration. It should be recognized that data, along with corresponding copies, may also be stored in the local memory unit 112 of computer system 110. As a result, the restore cost would be determined, at least in part, by the restoration parameter as defined by the number of copies of data and the number of backup storage systems that store the copies.

In sub-step 293, the identified quality of restoration indicates a rate of restoration associated with the data to be restored. The rate of restoration is the speed (also referred to as frequency, bandwidth, baud, etc.) at which the restore process 151-2 restores data. The range (e.g., maximum bandwidth) for the rate of restoration is typically enabled by the type of network connection and networking equipment (e.g., dial-up, cable modem, T1, etc.) utilized by both a user 101 and the computer system 110. For example, a user 101 may request to restore digital photography files with a rate of restoration at 300 kilobytes per second so as to not consume all of the user's bandwidth. Thus, the restore cost would be determined, at least in part, by the restoration parameter as defined by the 300 kilobyte per second rate of restoration.

In sub-step 294, payment process 160-2 computes a restore cost of the data based on the quality of restoration that was identified in sub-steps 290 through 293. Furthermore, in a particular configuration, payment process 160-2 computes a first restore cost on data having a first quality of restoration that is different than a second restore cost computed on data having a second quality of restoration. For example, payment process 160-2 computes a first restore cost for an image file having a first quality of restoration with a rate of restoration at 200 kilobytes per second, while a second restore cost is computed for an image file having a second quality of restoration with a rate of restoration at fifty kilobytes per second. As a result, the first restore cost computed according to the 200 kilobyte per second rate is different than the second restore cost computed according to the fifty kilobyte per second rate.

It should be noted that the first restore cost may be more than the second restore cost, or vice versa.

Figure 10:
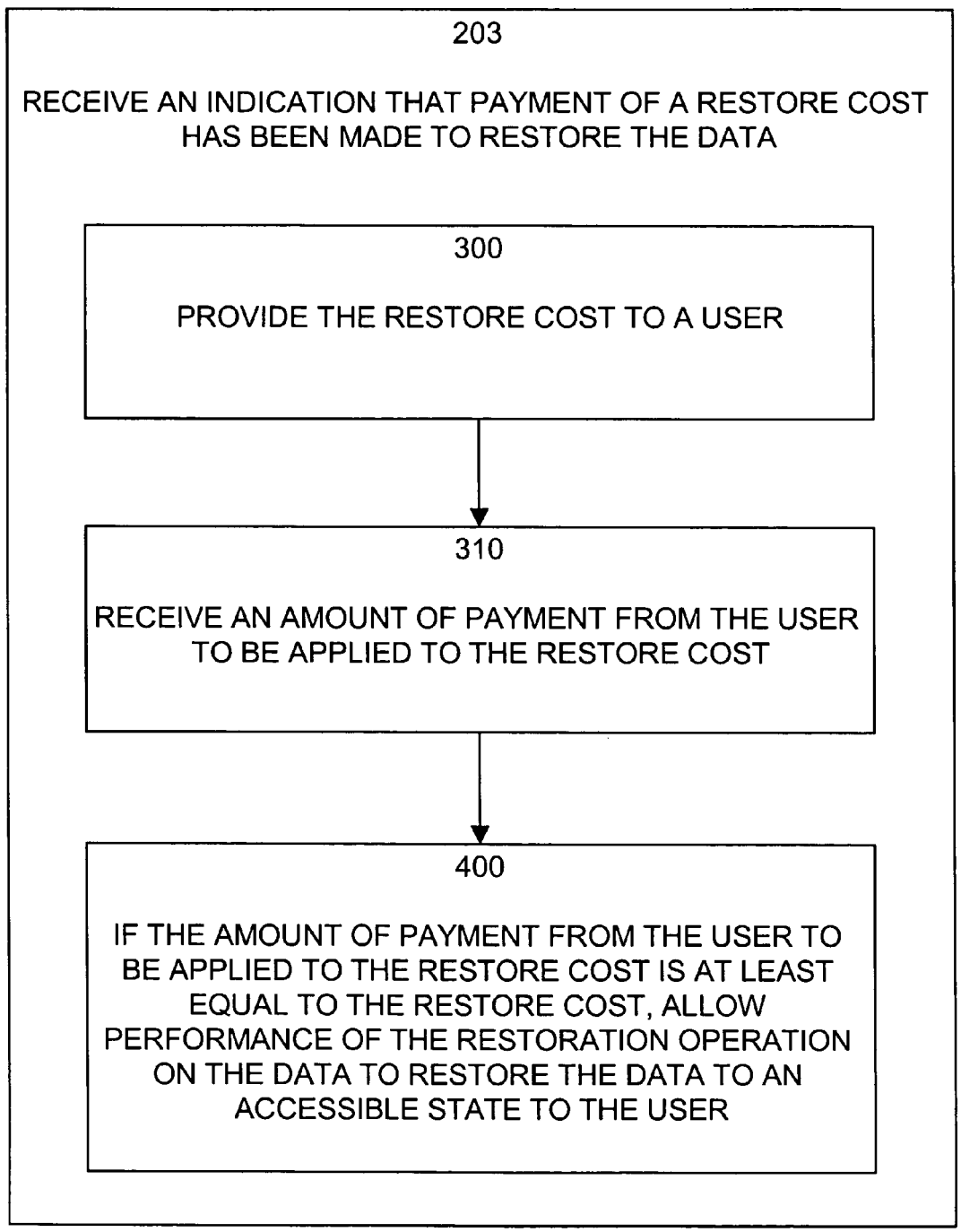
FIG. 10 is a flow chart of processing steps that shows details of processing operations to receive an indication that payment of the restore cost has been made to restore data in accordance with one configuration of the backup and restoration system.

FIG. 10 is a flow chart of processing steps that shows details of processing step 203 (from FIG. 2) that receives an indication that payment of a restore cost has been made to restore the data in accordance with example configurations. It is to be understood that these configurations are shown by way of example only and are not intended to limit the scope of the invention to such exact example descriptions.

In FIG. 10, in sub-step 300, at a time after obtaining the restore cost in accordance with step 202, payment process 160-2 provides the restore cost to the a user 101. Typically the restore cost is provided via the network 105 in an electronic format such as an email, to a graphical user interface (GUI) as part of a corresponding client-side software application, or any similar means for electronically transferring data in a viewable format. For example, if a restore cost is computed to be fifty dollars, payment process 160-2 will transfer this information electronically via the Internet to a corresponding client-side GUI running on a user's 101 personal computer.

In sub-step 310, payment process 160-2 receives an amount of payment from a user 101 to be applied to the restore cost. Generally, payment is received electronically through various electronic payment methods that are commonly used and known in the art (e.g., electronic funds transfer from a bank account, electronic credit card payment, third party vendors such as "PAYPAL®", a registered trademark of eBay, Inc., and the like). It should be recognized that in an alternative embodiment of the backup and restoration system, payment may be submitted through more conventional means, such as by a personal check, credit card, cash or the like. In such a case, the payment information would have to be manually entered into computer system 110. Upon receipt of the payment, payment process 160-2 compares the amount of the payment from the restore cost. The result of the comparison affects the restore process 151-2 as will be discussed in more detail. For example, if the restore cost is eighty dollars and payment is received for fifty dollars, the fifty dollar payment is compared to the eighty dollar restore cost to yield a result which will affect the restore process 151-2.

In sub-step 400, if the amount of payment received from a user 101 in accordance with sub-step 310 is at least equal to the restore cost, then payment process 160-2 allows performance of the restoration operation on the data to restore to an accessible state to the user. In other words, if payment from the user is sufficient, the restoration process 151-2 restores data to the user in an accessible state. An accessible state allows a user to access and modify data (e.g., read/write privileges). An accessible state to a user 101 may exist for data stored on both the user's computer and the backup storage system 125. For example, suppose the restore cost to restore certain data is $100, if payment process 160-2 receives payment from a user 101 that is at least $100 then restore process 151-2 restores data to an accessible state. The restore process does not necessarily store the data to the user's computer. Instead, the restore process 151-2 may only restore data to an accessible state in the backup storage device 125. Alternatively, if payment process 160-2 receives payment from the user that is less than $100 then restore process 151-2 does not restore the data to an accessible state. Nevertheless, upon indication of insufficient payment (e.g., a rejected credit car or bounced check), restore process may still restore data via network 105 to a user. However, in such a case the data will be delivered in an inaccessible state where the accessibility of the data is contingent upon full remuneration of the restore cost 180. Upon the user providing sufficient payment, restore process 151-2 will change the state of the data to an accessible state (e.g., provide a password and/or encryption key to decrypt or otherwise make the data accessible by the user). In one configuration, the user chooses how much data is to be restored (e.g. file by file) and the system provides the restore cost dynamically. At that point, the user can choose to 1) not restore if the cost is too high, 2) change how many files to restore (and therefore the cost) by adding or removing files, or 3) elect to pay and restore the data in the selected files.

Figure 11:
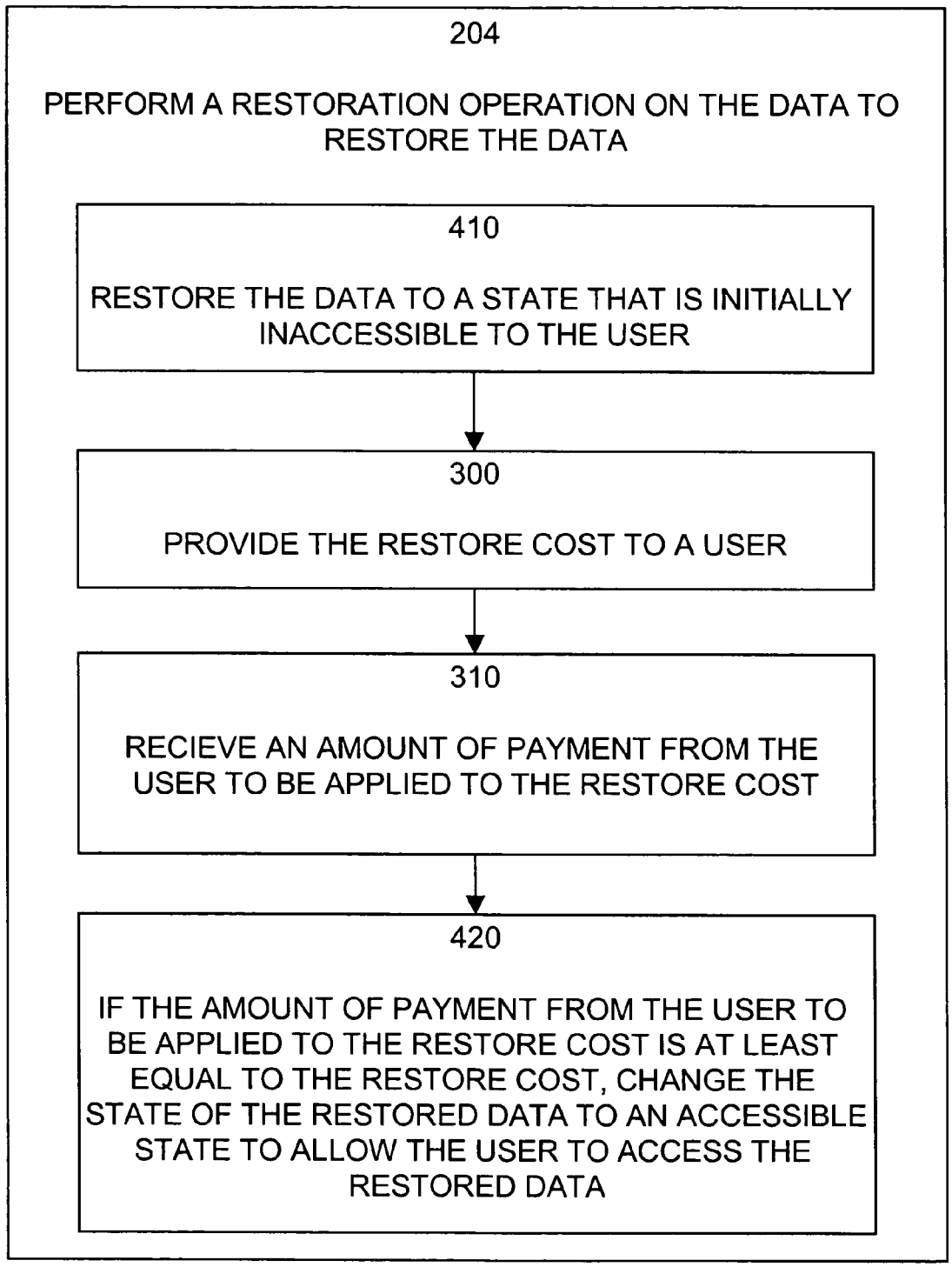
FIG. 11 is a flow chart of processing steps that shows details of processing operations to perform a restoration operation on data to restore the data in accordance with one configuration of the backup and restoration system.

FIG. 11 is a flow chart of processing steps that shows details of processing step 204 (from FIG. 2) that performs a restoration operation on the data to restore the data in accordance with example configurations. It is to be understood that these configurations are shown by way of example only and are not intended to limit the scope of the invention to such exact example descriptions.

In FIG. 11, in sub-step 410, at a time after a request to restore data has been received in accordance with step 201, restore process 151-2 stores data via network 105 to a user 101 (e.g., personal computer) in a state that is initially inaccessible to the user.

In such a case, the data will be encrypted, password protected, etc. on the user's medium such that the user cannot access the data (e.g., no read/write privileges). For example, in one configuration, at a time after receiving a request to restore data, restore process 151-2 stores encrypted data over the Internet to a user's personal computer such that the data is inaccessible to the user.

In sub-step 420, if the amount of payment received from a user 101 in accordance with sub-step 310 is at least equal to the restore cost, then restore process 151-2 changes the state of the restored data to an accessible state to allow the user 101 to access the restored data. In other words, if payment from the user is sufficient, the restoration process 151-2 changes the restored data to an accessible state (e.g. by removing the password or encryption from the file). By changing the restored data to an accessible state, restore process 151-2 performs a corresponding function(s) necessary for accessing inaccessible data (e.g., providing a password and/or encryption key). For example, suppose the restore cost to restore certain data is $100, if payment process 160-2 receives payment from a user 101 that is at least $100 then restore process 151-2 changes the stored data to an accessible state by providing user 108 with a password. Alternatively, if payment process 160-2 receives payment from the user that is less than $100, then restore process 151-2 does not restore the data to an accessible state.

Configurations disclosed herein include various alternative configurations of the aforementioned embodiments. As an example, the system can include processing to remove duplicate files when performing a backup and/or restore operation. As an example, an algorithm could be applied to identify two duplicate files in the same directory and could remove these files during the backup or restore operation. Another alternative feature of the system disclosed herein is to calculate, into the restore cost, a factor as to whether a particular file has been "used". At each periodic backup, the system can perform an incremental backup of those files that have changed since the last backup process. During this process, the system can maintain information such as a table of files that are commonly included in each backup, a reference as to how many times a particular file is backed up over time. This data indicates if a file is changing frequently and is thus an "important" file to that user (or to an application that the user uses). If a file has been emailed, printed, accessed multiple times, or otherwise has substantial use or access by a user and changes from backup to backup, it is likely to be more valuable to that user. Thus, a factor in computing the restore cost in one configuration can take into account a user who requests to restore a commonly used file and a premium is charged for this file, as opposed to other less used files. The premium can be factored into the restore cost as a surcharge (e.g. 5 cents) per time that file was backed up. This if a file is backed up 10 times, the surcharge of 50 cents could be added to the restore cost if that file is to be included in the restore.

In yet another alternative embodiment, the system disclosed herein can provide or generate previews (e.g., locked PDFs) of the backed up files that can be restored. This allows users to view a file before restoration to ensure they are retrieving the file they want before paying.

The restore process in one configuration can be interactive allowing the user to select some files and see the total cost to restore for the set of files selected. The system can calculate a restore "shopping cart" price on the fly based on the various restore cost factors (one, some or all) disclosed herein. In one configuration a cumulative pricing ladder is applied so that the more files the user selects for restoration, the less each costs (or the less cost per file is applied). This would encourage users to restore more files as the cost per file were to get lower (but the overall cost to restore would get greater).

In another configuration, the value computed into a restore cost, for a file, automatically increases on subsequent restores once a user restores the file. In this configuration, the system accounts for the probability of a file needing to be restored. Thus if a user has backed up 100 files, and each file cost $1 to restore, the restore cost is computed by 100 files times $1× the probability of needing to be restored. The system can assume the first probability of needing to be restored for a file is $\frac{1}{1000}$. At first the user's files are worth 100×$1×$\frac{1}{1000}$=10 cents. Once a restore is performed the system make the assumption that all or some of the files in that restore have been lost so now the restore probability goes up greatly (perhaps to 1 in 10) so our value of our stored files is now worth 100×$1×$\frac{1}{10}$=$10 for a subsequent restore. In this configuration, data that is not restored is maintained by the system even if not restored.

In yet another configuration, the system disclosed herein provides, on a periodic basis (e.g., after every backup, or every week, month, etc.) a notification (e.g. via the client 195, or via an email message) to the user on the key statistics associated with that user's backup data. This information can include a number of files, a price if they were to restore all now, or the like. Through this interface, the user could choose to continue to backup as usual, keep what is currently backed up but not add any new files, or keep only new files and get rid of the previous backup data, or stop backing up data all together. By periodically indicating such information and options to a user, the system keeps the user account active and accurate so the system does not operate to back up data for a user that no longer has any intention of recovering it in the future.

While configurations of the system and method have been particularly shown and described with references to configurations thereof, it will be understood by those skilled in the art that various changes in form and details may be made therein without departing from the scope of the backup and restoration system. Accordingly, the backup and restoration system is not intended to be limited by the example configurations provided above.

What is claimed is:

1. A computer-implemented method in which at least one computer system accesses instructions from computer storage and executes the instructions to perform steps of:

receiving data from a remote source;

storing, free of charge, a copy of the data received from the remote source;

upon receiving a request to restore the data in response to a loss of the data at the remote source, calculating the restore cost based at least in part on a duration of time passing since initial storage of the copy of the data received from the remote source, the calculated restore cost being a higher amount for longer respective times of storing the copy of the data;

calculating the restore cost based at least in part on a frequency of amending the copy of the data received from the remote source, the frequency indicating a relative importance of the received data;

obtaining the restore cost specifying a fee for restoring the data at the remote source;

receiving an indication that payment of the restore cost has been made to restore the data; and to satisfy the request to restore the data, forwarding the copy of the data to the remote source to restore the data.

2. The computer-implemented method of claim 1 comprising:

storing data from a first medium to a second medium for subsequent access and indicating to a user at the remote source that no monetary fee is required for storing the data; and wherein obtaining a restore cost to restore the data comprises:

identifying a set of restoration parameters associated with the data to be restored; and computing the restore cost of the data based on the set of restoration parameters.

3. The computer-implemented method of claim 2, wherein identifying a set of restoration parameters associated with the data to be restored comprises:

identifying a quality of restoration associated with the data to be restored; and wherein computing the restore cost of the data based on the set of restoration parameters comprises:

computing a restore cost of the data based on the quality of restoration associated with the data to be restored, wherein computing a restore cost on data having a first quality of restoration computes a first restore cost that is different than a second restore cost computed on data having a second quality of restoration.

4. The computer-implemented method of claim 3, wherein identifying a quality of restoration of the data to be restored comprises:

indicating a level of protection associated with the data to be restored, the level of protection related to secured data communications over a network.

5. The computer-implemented method of claim 3, wherein identifying a quality of restoration of the data to be restored comprises:

indicating a level of protection associated with the data to be restored, the level of protection related to a number of copies of the data to be restored.

6. The computer-implemented method of claim 3, wherein identifying a quality of restoration of the data to be restored comprises:

indicating a rate of transfer associated with performing the restoration operation on the data to restore the data.

7. The computer-implemented method of claim 2, wherein identifying a set of restoration parameters associated with the data to be restored comprises:

identifying a type of data to be restored; and wherein computing the restore cost of the data based on the set of restoration parameters comprises:

computing a restore cost of the data based on the type of data to be restored, wherein computing a restore cost on data having a first type computes a first restore cost that is different than a second restore cost computed on data having a second type.

8. The computer-implemented method of claim 2, wherein identifying a set of restoration parameters associated with the data to be restored comprises:

identifying a size associated with the copy of data to be restored; and wherein computing the restore cost of the data based on the set of restoration parameters comprises:

computing a restore cost of the data based on the size, wherein computing a restore cost on data having a first size computes a first restore cost that is different than a second restore cost computed on data having a second size.

9. The computer-implemented method of claim 2, wherein identifying a set of restoration parameters associated with the data to be restored comprises:

identifying an amount of data units to be restored; and wherein computing the restore cost of the data based on the set of restoration parameters comprises:

computing a restore cost of the data based on the amount of data units to be restored, wherein computing a restore cost on a first amount of data units computes a first restore cost that is different than a second restore cost computed on a second amount of data units.

10. The computer-implemented method of claim 2, wherein identifying a set of restoration parameters associated with the data to be restored comprises:

identifying a data life associated with the data to be restored, the data life indicating the amount of time since the data was first stored; and wherein computing the restore cost of the data based on the set of restoration parameters comprises:

computing a restore cost of the data based on the data life associated with the data to be restored, wherein computing a restore cost on data having a first data life computes a first restore cost that is different than a second restore cost computed on data having a second data life.

11. The computer-implemented method of claim 2, wherein the first medium is storage associated with a first computer system and wherein the second medium is storage associated with a second computer system coupled via a network to the first computer system;

and wherein identifying a set of restoration parameters associated with the data to be restored comprises:

identifying a destination for the data to be restored, the destination indicating storage associate with a computer system; and wherein computing the restore cost of the data based on the set of restoration parameters comprises:

computing a restore cost of the data based on the destination for the data to be restored, wherein computing a restore cost on data having a first destination to storage associated with the first computer system computes a first restore cost that is different than a second restore cost computed on data having a second destination to storage associated with a third computer system, the third computer system coupled via the network to the second computer system.

12. The computer-implemented method as in claim 1, wherein obtaining the restore cost includes steps of:
identifying a set of restoration parameters associated with the copy of the data, the restoration parameters including a parameter indicating a frequency of restoration associated with the copy of the data, the frequency of restoration being based on an amount of time between receiving the request to restore the data and at least two prior requests to restore the data; and
computing the restore cost based on the frequency of restoration associated with the data received from the remote source.

13. The computer-implemented method of claim 12, wherein identifying the frequency of restoration associated with the data to be restored comprises:
utilizing at least two prior requests to restore first data received during a first span of time to identify a first frequency of restoration associated with the first data; and
utilizing at least two prior requests to restore second data received during a second span of time to identify a second frequency of restoration associated with the second data.

14. The computer-implemented method of claim 13, wherein computing the restore cost includes:
computing a first restore cost for the first data having the first frequency of restoration; and
computing a second restore cost for the second data having the second frequency of restoration, the second restore cost different than the first restore cost.

15. The computer-implemented method as in claim 1 further comprising:
calculating the restore cost based at least in part on a duration of time between storing the copy of the data received from the remote source and receiving the request, the calculated restore cost being a higher value for longer respective times of storing the copy.

16. The computer-implemented method in claim 15 further comprising:
generating a preview associated with the copy of the data; and
providing the preview to the remote source enabling the remote source to view the preview and determine whether to generate the request to restore the data.

17. The computer-implemented method of claim 1, wherein receiving the indication that payment of the restore cost has been made to restore the data comprises:
providing the restore cost to a user;
receiving an amount of payment from the user to be applied to the restore cost;
if the amount of payment from the user to be applied to the restore cost is at least equal to the restore cost, allowing performance of the restoration operation on the data to restore the data to an accessible state to the user.

18. The computer-implemented method of claim 1 comprising: restoring the data via the restoration operation performed on the data
restoring the data to a state in which the forwarded copy of the data is initially inaccessible to a user at the remote source; and
wherein receiving the indication that payment of the restore cost has been made to restore the data comprises:
providing the restore cost to the user;
receiving an amount of payment from the user to be applied to the restore cost;
if the amount of payment from the user to be applied to the restore cost is at least equal to the restore cost, changing the state of the restored data to an accessible state to allow the user to access the restored data.

19. The computer-implemented method in claim 1 further comprising:
providing the remote source with a listing of backed up data, the listing including an indication that the copy of the data is backed up and available for retrieval, the listing specifying the restore cost associated with restoring of the copy of the data to the remote source.

20. The computer-implemented method in claim 1 further comprising:
producing at least one photograph based on the copy of the data stored free of charge; and
to satisfy the request to restore the copy of the data, forwarding the at least one photograph to the remote source generating the request.

21. The computer-implemented method as in claim 1 further comprising:
upon receiving the request to restore the data, authenticating the remote source of the request;
upon determining the remote source is valid, performing the steps of calculating the restore cost and obtaining the restore cost with respect to each file previously received as data from the remote source for storage;
presenting a listing of files previously received from the remote source and currently stored on behalf of the remote source, wherein the listing presents
(i) a restore cost for each respective file,
(ii) a preview of a portion of each respective file and
(iii) an indication of metadata associated with each respective file;
receiving a selection of a subset of the files;
determining an aggregate restore cost based on an individual restore cost of each respective file in the selected subset of the files; and
prior to receiving an indication of payment of the aggregate restore cost, providing an option to select a different subset of the files stored on behalf of the remote source.

22. The computer-implemented method as in claim 1, wherein calculating the restore cost based at least in part on the duration of time passing since initial storage of the copy of the data received from the remote source further comprising:
restricting the restore cost with respect to a maximum data life parameter, wherein the maximum data life parameter designates a fixed restore cost for the copy of data if the duration of time passing since the initial storage of the copy of data exceeds a length of time represented by the maximum data life parameter.

23. The computer-implemented method as in claim 1, wherein calculating the restore cost further comprising:
calculating the restore cost based on the frequency of restoration, wherein the frequency of restoration further indicates a frequency at which the remote source has previously requested to perform a restore operation on the copy of the data, wherein the frequency of restoration further takes into account prior requests, from the remote source, to perform the restore operation on at least one copy of different data.

24. The computer-implemented method as in claim 1, comprising: receiving a desired rate of restoration from the remote source, the desired rate of restoration representing a desired speed, with respect to a bandwidth range, at which the remote source prefers to receive the copy of the data, the desired rate of restoration ensuring receipt of the copy of the data utilizes only a portion of a total bandwidth currently utilized by the remote source; and forwarding the copy of the data to the remote source in accordance with the desired rate of restoration.

25. The computer-implemented method as in claim 1, comprising:
wherein receiving the request to restore the data includes: receiving a desired rate of restoration from the remote source, the desired rate of restoration representing a desired speed, with respect to a bandwidth range, at which the remote source prefers to receive the copy of the data, the desired rate of restoration ensuring receipt of the copy of the data utilizes only a portion of a total bandwidth currently utilized by the remote source;
upon receiving the request to restore the data, authenticating the remote source of the request;
upon determining the remote source is valid, performing the steps of calculating the restore cost and obtaining the restore cost with respect to each stored file previously received as data from the remote source for storage, wherein calculating the restore cost for each stored file includes:
(i) calculating the restore cost based on the frequency of restoration, wherein the frequency of restoration further indicates a frequency at which the remote source has previously requested to perform a restore operation on the stored file, wherein the frequency of restoration further takes into account prior requests, from the remote source, to perform the restore operation on other files stored on the behalf on the remote source;
(ii) restricting the restore cost with respect to a maximum data life parameter, wherein the maximum data life parameter designates a fixed restore cost for the stored file if the duration of time passing since the initial storage of the stored file exceeds a length of time represented by the maximum data life parameter;
presenting a listing of stored files previously received from the remote source and currently stored on behalf of the remote source, wherein the listing presents (i) a restore cost for each respective stored file, (ii) a preview of a portion of each respective stored file and (iii) an indication of metadata associated with each respective stored file;
receiving a selection of a subset of the stored files;
determining an aggregate restore cost based on an individual restore cost of each respective stored file in the selected subset of the stored files; and
prior to receiving an indication of payment of the aggregate restore cost, providing an option to select a different subset of the stored files stored; and
upon receiving indication of payment of the aggregate restore cost, forwarding the selected subset of the stored files to the remote source in accordance with the desired rate of restoration.

26. A computer system comprising:
a memory;
a processor;
an interconnection mechanism coupling the memory and the processor allow communication there between;
wherein the memory is encoded with a backup application and a restore application including a payment application, that when executed in the processor, provides a backup process and a restore process including a payment process, the backup process, when executed, storing data from a user, and the restore process, when executed, restoring data to the user by causing the computer system to perform the operations of:
storing data from a first medium to a second medium for subsequent access;
receiving a request to restore the data;
obtaining a restore cost to restore the data wherein obtaining the restore cost includes:
(i) identifying a set of restoration parameters associated with the data, the restoration parameters including a frequency of restoration indicating a frequency at which a user requests to perform a restore operation on the data, wherein identifying the frequency of restoration includes: utilizing an amount of time occurring between the received request to restore data and at least two prior requests to restore the data;
(ii) computing the restore cost based on the frequency of restoration associated with the data to be restored, wherein computing the restore cost includes: calculating the restore cost based at least in part on a frequency of amending the copy of the data received from the remote source, the frequency indicating a relative importance of the received data;
receiving an indication that payment of a restore cost has been made to restore the data; and
restoring the data via a restoration operation performed on the data.

27. The computer system of claim 26 wherein the payment process, when executed, causes the computer system to perform the operations of identifying a set of restoration parameters associated with the data to be restored, the computer system performs the operations of:
identifying a type of data to be restored;
identifying a size of data to be restored;
identifying an amount of data units to be restored;
identifying a data life associated with the data to be restored, the data life indicating the amount of time since the data was first stored; and
wherein when the payment process causes the computer to perform the operation of computing the restore cost of the data based on the set of restoration parameters, the computer performs the operation of:
computing a restore cost of the data based on the type of data to be restored, wherein computing a restore cost on data having a first type computes a first restore cost that is different than a second restore cost computed on data having a second type;
computing the restore cost of the data based on the size of data to be restored, wherein computing a restore cost on data having a first size computes a third restore cost that is different than a fourth restore cost computed on data having a second size;
computing the restore cost of the data based on the amount of data units to be restored, wherein computing a restore cost on a first amount of data units computes a fifth restore cost that is different than a sixth restore cost computed on a second amount of data units; and
computing the restore cost of the data based on the data life associated with the data to be restored, wherein computing a restore cost on data having a first data life computes a seventh restore cost that is different than an eighth restore cost computed on data having a second data life.

28. The computer system of claim 26 wherein the payment process, when executed, causes the computer system to perform the operations of identifying a set of restoration parameters associated with the data to be restored, the computer system performs the operations of:

identifying a quality of restoration associated with the data to be restored; and wherein when the payment process causes the computer to perform the operation of computing the restore cost of the data based on the set of restoration parameters, the computer performs the operation of:

computing a restore cost of the data based on the quality of restoration associated with the data to be restored, wherein computing a restore cost on data having a first quality of restoration computes a third restore cost that is different than a fourth restore cost computed on data having a second quality of restoration.

29. The computer system of claim 26 wherein the first medium is storage associated with a first computer system and wherein the second medium is storage associated with a second computer system coupled via a network to the first computer system; and wherein the payment process, when executed, causes the computer system to perform the operations of identifying a set of restoration parameters associated with the data to be restored, the computer system performs the operation of:

identifying a destination for the data to be restored, the destination indicating storage associated with a computer system; and wherein when the payment process causes the computer to perform the operation of computing the restore cost of the data based on the set of restoration parameters, the computer performs the operation of:

computing a restore cost of the data based on the destination for the data to be restored, wherein computing a restore cost on data having a first destination to storage associated with the first computer system computes a first restore cost that is different than a second restore cost computed on data having a second destination to storage associated with a third computer system, the third computer system coupled via the network to the second computer system.

30. A computer readable storage medium including computer program logic encoded thereon that provides an application that, upon executing in a processor, provides a restoration process and a payment process that provides restoration of stored data by causing a computer system to perform the operations of:

storing data from a first medium to a second medium for subsequent access;

receiving a request to restore the data from the second medium to the first medium;

obtaining a restore cost to restore the data, wherein obtaining the restore cost includes:

(i) identifying a set of restoration parameters associated with the data, the restoration parameters including a frequency of restoration indicating a frequency at which a user requests to perform a restore operation on the data, wherein identifying the frequency of restoration comprises utilizing an amount of time occurring between the received request to restore data and at least two prior requests to restore the data;

(ii) computing the restore cost based on the frequency of restoration associated with the data to be restored, wherein computing the restore cost includes: calculating the restore cost based at least in part on a frequency of amending the copy of the data received from the remote source, the frequency indicating a relative importance of the received data;

receiving an indication that payment of the restore cost has been made to restore the data; and restoring the data via a restoration operation performed on the data.

31. A computer system comprising:

a processor;

a memory unit that stores instructions associated with an application executed by the processor; and an interconnect coupling the processor and the memory unit, enabling the computer system to execute the application and perform operations of:

receiving data from a remote source;

storing, free of charge, a copy of the data received from the remote source;

upon receiving a request to restore the data in response to a loss of the data at the remote source, calculating the restore cost based at least in part on a duration of time passing since initial storage of the copy of the data received from the remote source, the calculated restore cost being a higher amount for longer respective times of storing the copy of the data; calculating the restore cost based at least in part on a frequency of amending the copy of the data received from the remote source, the frequency indicating a relative importance of the received data;

obtaining the restore cost specifying a fee for restoring the data at the remote source;

receiving an indication that payment of the restore cost has been made to restore the data; and to satisfy the request to restore the data, forwarding the copy of the data to the remote source to restore the data.

* * * * *